(12) United States Patent
Camporese et al.

(10) Patent No.: US 11,317,643 B2
(45) Date of Patent: May 3, 2022

(54) FOOD PRODUCT, DEVICE AND PRODUCTION METHOD OF SAID FOOD PRODUCT

(71) Applicant: MAMA CHIPS S.R.L.S., Campo San Martino (IT)

(72) Inventors: Enrico Camporese, Selvazzano Dentro (IT); Manuel Marcon, Curtarolo (IT)

(73) Assignee: MAMA CHIPS S.R.L.S., Campo San Martino (IT)

(*) Notice: Subject to any disclaimer, the term of this patent is extended or adjusted under 35 U.S.C. 154(b) by 71 days.

(21) Appl. No.: 16/478,988

(22) PCT Filed: Feb. 6, 2018

(86) PCT No.: PCT/EP2018/052899
§ 371 (c)(1),
(2) Date: Jul. 18, 2019

(87) PCT Pub. No.: WO2018/146072
PCT Pub. Date: Aug. 16, 2018

(65) Prior Publication Data
US 2019/0350238 A1 Nov. 21, 2019

(30) Foreign Application Priority Data

Feb. 8, 2017 (IT) .................. 102017000013899
Jun. 23, 2017 (IT) .................. 102017000070445

(51) Int. Cl.
*A23P 30/10* (2016.01)
*A23L 19/18* (2016.01)
*A23L 5/10* (2016.01)
*A23C 11/00* (2006.01)

(52) U.S. Cl.
CPC .............. *A23L 19/18* (2016.08); *A23L 5/11* (2016.08); *A23P 30/10* (2016.08); *A23C 11/00* (2013.01); *A23V 2002/00* (2013.01)

(58) Field of Classification Search
CPC ........................ A23P 30/10; A21C 11/00
See application file for complete search history.

(56) References Cited

U.S. PATENT DOCUMENTS

| | | | | |
|---|---|---|---|---|
| 1,915,614 A | * | 6/1933 | Parker | A23G 3/563 426/75 |
| 2,166,568 A | * | 7/1939 | Kuhlke | A23G 3/0252 426/414 |
| 2,851,931 A | * | 9/1958 | Leitzel | D21J 7/00 249/113 |
| 2,957,199 A | * | 10/1960 | Bentley | A22C 7/0015 425/278 |

(Continued)

OTHER PUBLICATIONS

International Search Report for corresponding PCT/EP2018/052899.

(Continued)

*Primary Examiner* — Seyed Masoud Malekzadeh
(74) *Attorney, Agent, or Firm* — Egbert, McDaniel & Swartz, PLLC

(57) ABSTRACT

A food product includes a thread obtained from a tuber that is wound and twisted in such a way to form a spherical ball. A production method for the food product provides for placing the spherical ball in a perforated spherical mold. A device for producing the food product allows formation of the spherical ball inside the mold.

8 Claims, 7 Drawing Sheets

(56) References Cited

U.S. PATENT DOCUMENTS

| | | | | | |
|---|---|---|---|---|---|
| 3,041,153 | A | * | 6/1962 | Elder | A01J 25/118 426/478 |
| 3,261,178 | A | * | 7/1966 | Okada | A23G 9/10 62/345 |
| 3,522,624 | A | * | 8/1970 | Tahmesian | A22C 7/0015 425/233 |
| 3,998,574 | A | * | 12/1976 | Blake | A22C 7/00 425/137 |
| 4,161,837 | A | * | 7/1979 | Johnston | A01K 97/04 249/92 |
| 4,413,461 | A | * | 11/1983 | Waldstrom | A23G 3/0289 425/126.2 |
| 4,557,117 | A | * | 12/1985 | Furia | A23G 9/08 425/126.2 |
| 4,746,523 | A | * | 5/1988 | Binley | A23G 9/083 264/28 |
| 4,767,307 | A | * | 8/1988 | Beer | A23G 9/083 425/394 |
| 5,066,502 | A | * | 11/1991 | Eales | A23G 3/563 426/75 |
| 5,305,687 | A | * | 4/1994 | Cantrell | A47J 43/20 220/4.22 |
| 5,618,463 | A | * | 4/1997 | Rindler | A23G 9/221 249/91 |
| 5,738,895 | A | * | 4/1998 | Fuchs | A23G 9/083 425/126.2 |
| 6,045,836 | A | * | 4/2000 | Saunier | A23P 10/10 426/91 |
| 7,210,916 | B2 | * | 5/2007 | Korndorfer | A23G 7/0031 425/126.2 |
| 9,380,790 | B2 | * | 7/2016 | Van Gerwen | A22C 7/0076 |
| 9,894,927 | B1 | * | 2/2018 | Roldan | A23P 30/10 |
| 2013/0269371 | A1 | * | 10/2013 | Lee | A23G 9/22 62/64 |
| 2015/0021458 | A1 | * | 1/2015 | Zorovich | B29C 33/0038 249/134 |

OTHER PUBLICATIONS

Anonymous, "Rösti-Grundrezept mit rohen Kartoffeln", Dec. 31, 2004 (Dec. 31, 2004), Betty Bossi, Retrieved from the Internet: URL: https://www.bettybossi.ch/BinaryContent/UploadedFiles/42yz2MOCVXxn6ystYuv0iw==20150727093508 31.ADET020a.pdf, [retrieved on Oct. 18, 2019].

Marten Rolff, "Geschmackssache Rösti", Jan. 22, 2016 (Jan. 22, 2016), Süddeutsche Zeitung Retrieved from the Internet: URL: http://www.sueddeutsche.de/stil/geschmackssache-roesti-1.2827218 [retrieved on Oct. 18, 2019].

Ohashi A I K, "Sand for casting mold has spherical shape containing synthetic mullite, and has preset particle size and surface area", Sep. 9, 2003, WPI/Thomson.

Database WPI Thomson Scientific, London, GB; vol. 1978, No. 21, AN 1978-37781A0.

* cited by examiner

FOOD PRODUCT, DEVICE AND PRODUCTION METHOD OF SAID FOOD PRODUCT

The present invention relates to the field of food products, in particular to a thread-like food product with the shape of a spherical ball, obtained from tubers, such as potatoes, and to the device and method used to obtain such a product.

Fried potatoes are known, which are obtained from potatoes cut in long strips and fried in oil, which are commonly known as "French Fries". Precooked fried potatoes are also known, which are first submitted to an oil cooking treatment at a temperature of approximately 100° C. and then to a freezing and packaging process. In order to eat it, the food product must be cooked in oil at a higher temperature, which is normally comprised between 170° C. and 220° C.

Fried potatoes of the type that is commonly called "chips" are known, which are obtained from potatoes cut in very thin slices that are fried in oil and packed in bags.

Moreover, food products that are commonly known as fried potatoes are known, which are obtained by extruding a mixture that contains potato flour, together with other ingredients. The extruded material, which can have a different section according to the type of extruder, is cut to size and cooked in oil or with another cooking method. In this way, it is possible to obtain potato-based food products with any shape, such as a grille shape, a helical shape, a tubular shape and any imaginary shape.

A typical Swiss potato-based plate is known, which is called Rosti, wherein potatoes are grated in a plurality of thin strips by means of a grater with large holes. The potato strips are compacted in such a way to form a disc-like portion that is fried in a pan with butter, forming a crisp golden crust only on the external surface of the disc-like portion. Obviously, because of the fact that the potato strips are compacted, the interior of the Rosti portion cannot be crisp.

Devices or tools suitable used to cut food products, typically vegetables, in strips or batons with low section, also called "a la julienne" are known. Preparations based on tubers that are cut in thin batons with variable length, which are cooked or frozen, are known.

Apparatuses and devices are known, which are suitable for giving a nestle-like configuration, i.e. a three-dimensional shape with a random arrangement, to the thread-like fresh pasta.

The thread-like pasta of known type is given a three-dimensional shape with a random arrangement and is then dried for easier portioning and marketing.

The nest-like thread-like pasta is used in food preparations wherein the shape of the pasta after cooking is not important. After cooking, in fact, the pasta disposed in a three-dimensional shape with a random arrangement has an irregular shape and an irregular arrangement.

Devices or tools suitable for cutting a fruit or a vegetable in a strip or continuous thread with low section are known.

The purpose of the present invention is to eliminate the drawbacks of the prior art by providing a device and a method suitable for giving a three-dimensional shape with a random arrangement to continuous threads of food products.

Another purpose of the present invention is to ensure that the thread-like food product can maintain said three-dimensional shape with a random arrangement during the entire cooking or freezing process.

Another purpose of the present invention is to guarantee uniform cooking, crispness and crumbliness to the food product.

Another purpose of the invention is to reduce the cooking time of the food product.

These purposes are obtained according to the present invention with the food product, the method and the device as defined in the independent claims.

Advantageous embodiments appear from the dependent claims.

The present invention comes from the need of making portions of fried potatoes (chips) with a spherical shape, given that the only food products with a spherical shape are obtained from an extruded potato dough, which surely lacks the flavor and the organoleptic features of chips.

The first attempts consisted in frying a small ball that was obtained directly from a potato. However, the attempts failed because the interior of the potato ball remained raw. So the inventor understood that it was necessary to obtain potato threads and to wind said potato threads in such a way to form a spherical ball.

Machines suitable for cutting vegetables into threads are known on the market. However, problems were encountered after obtaining potato threads with the machines of the prior art because it was impossible to obtain a spherical ball that maintained its shape during the cooking process. In fact, during the cooking process the potato threads would detach and aggregate, obtaining a disc-like portion similar to Rosti.

In order to solve the inconvenience, the inventor placed a spherical ball of potato threads inside a perforated spherical enclosure, such as a metal tea strainer with spherical shape and, and fried said ball inside the enclosure. The holes of the enclosure let the oil pass through, frying the ball that was contained inside the enclosure, and the walls of the enclosure maintained the spherical shape of the potato threads ball. In this way, a ball of potato threads with spherical shape was obtained.

Although such a food product complied with the requested aesthetic features, it was impaired by some drawbacks, which were especially due to the fact that cooking was irregular in several points, with different consistencies in different products.

While repeating the cooking process, the inventor noted that, when the enclosure with the potato-thread ball was immersed in oil, the air bubbles that are typically seen in the oil during the frying process had a limited time and increased when the enclosure was moved in the boiling oil. Such a drawback was due to the fact that the enclosure had very small holes of approximately 1 mm.

In order to solve this problem, a suitable mold with a spherical shape and larger holes was created, in order to favor the penetration of the oil. For example, holes of approximately 2 mm were created. In this way, the product improved considerably because it was uniformly cooked. However, it did not have the crispness that is typical of chips.

After carrying out several tests, the inventor understood that the problem could be the excessive thickness of the potato thread. Therefore, additional tests were carried out with a potato thread having a thickness lower than 5 mm, preferably 3 mm. In this way, a better, yet not ideal product was obtained.

So, the inventor started to carry out research activities, testing different types of oils, potatoes and cooking temperatures. After the tests, the product improved, but was not perfect because it was not as crisp as traditional chips. Such a drawback was solved by washing the potato threads in order to eliminate the starch. In this way, the product was as crisp as traditional chips.

After obtaining the correct consistency and crispness of the food product, a new problem was encountered during consumption because the food product would crumble after the first bite, being very difficult to eat. As a matter of fact, the enclosure had a diameter of 5 cm and the food product was too big to be eaten in one bite. In order to solve such a drawback, the dimensions of the strainer were reduced to 2-4 cm, in such a way to form a food product that could be eaten in one bite with an extremely appetizing flavor, without crumbling in the user's hand.

After obtaining the desired food product, the inventor developed a machine used to industrialize the production of said food product.

Additional characteristics of the invention will appear clearer from the following description, with reference to the drawings attached as an illustrative, not limiting example.

FIG. 1 is a diagrammatic sectional view of the device according to the invention;

FIG. 2 in an enlarged view of the mold of FIG. 1;

Figure 1:
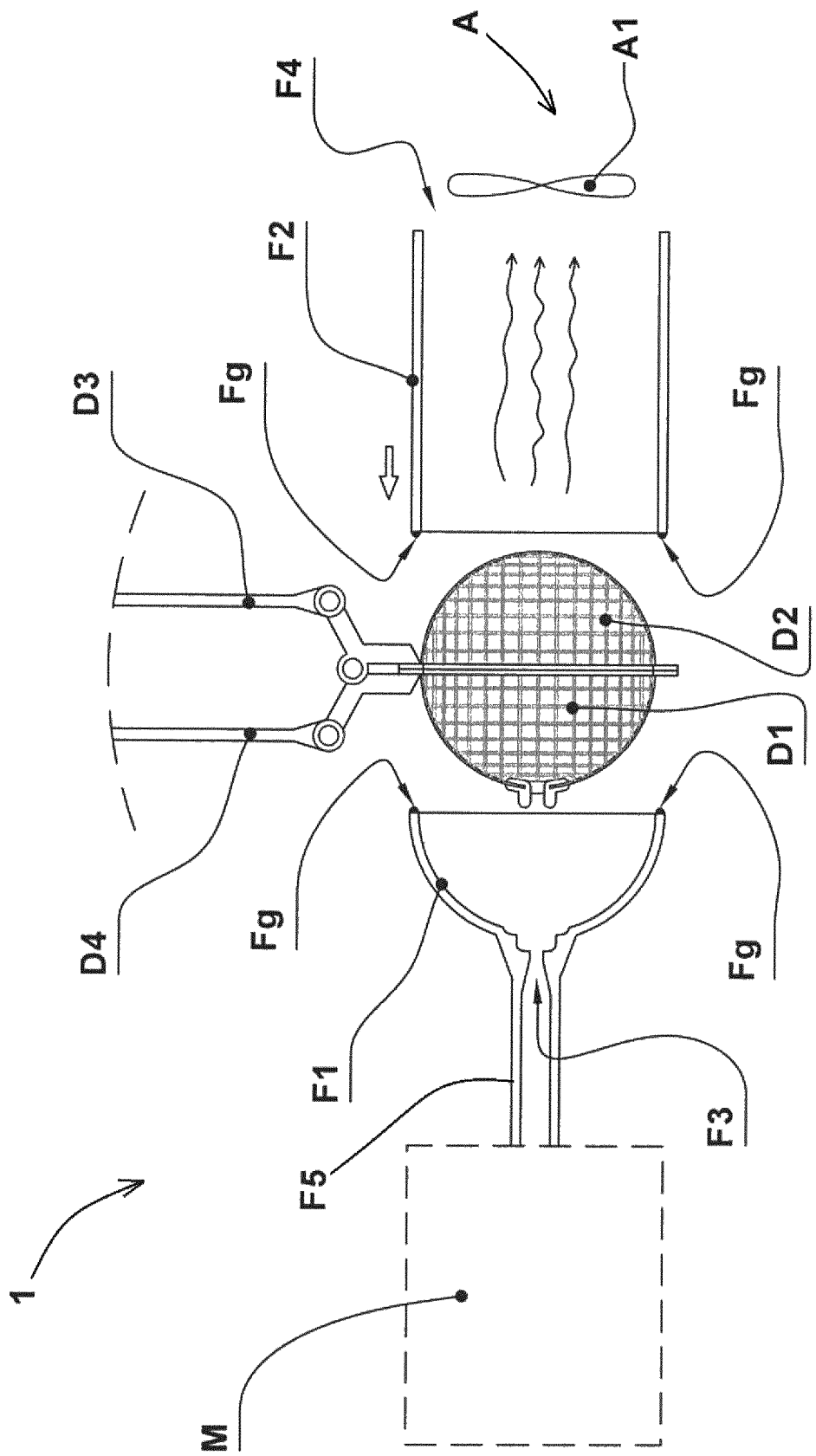
Figure 2:
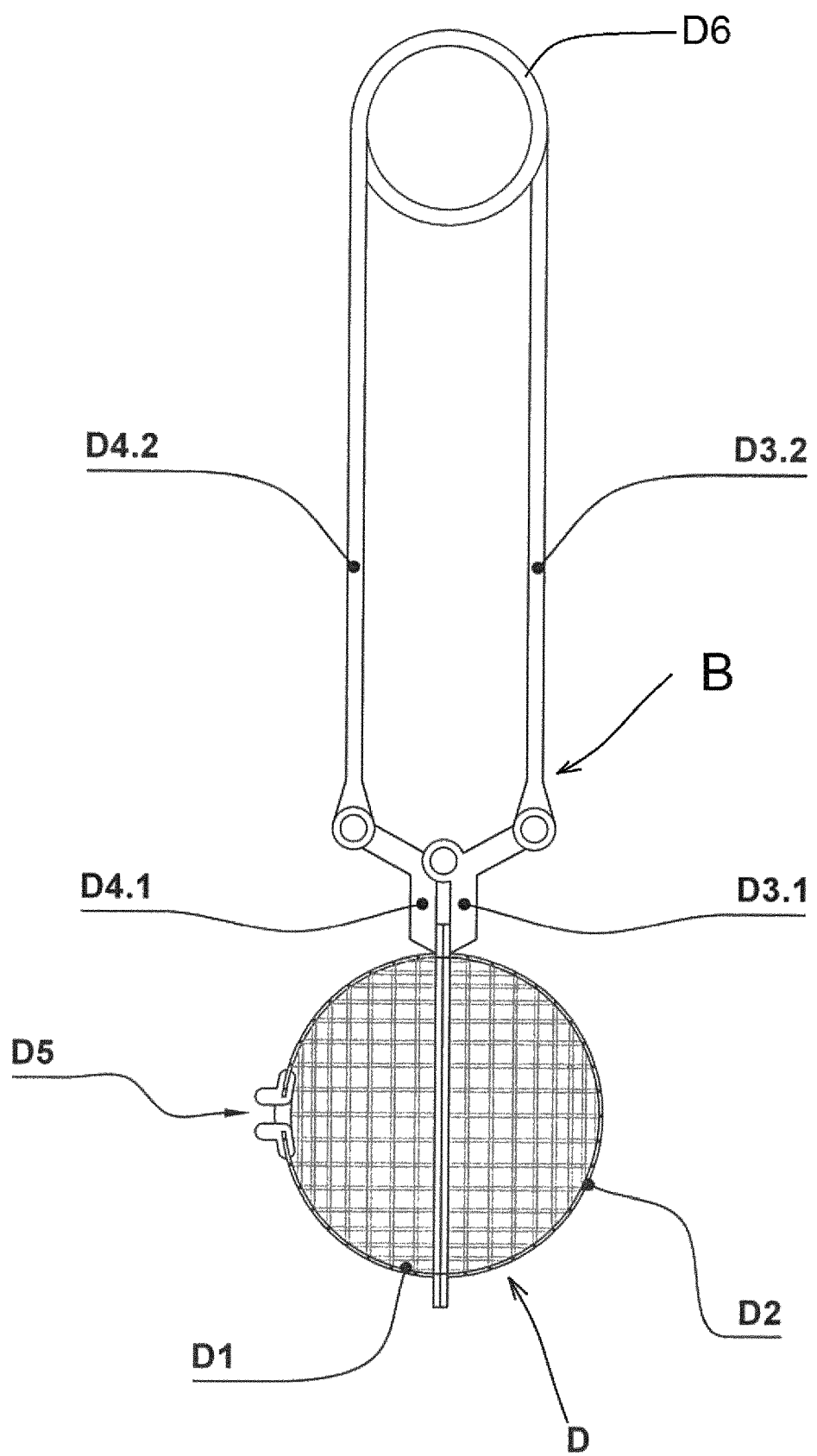
Figure 3:
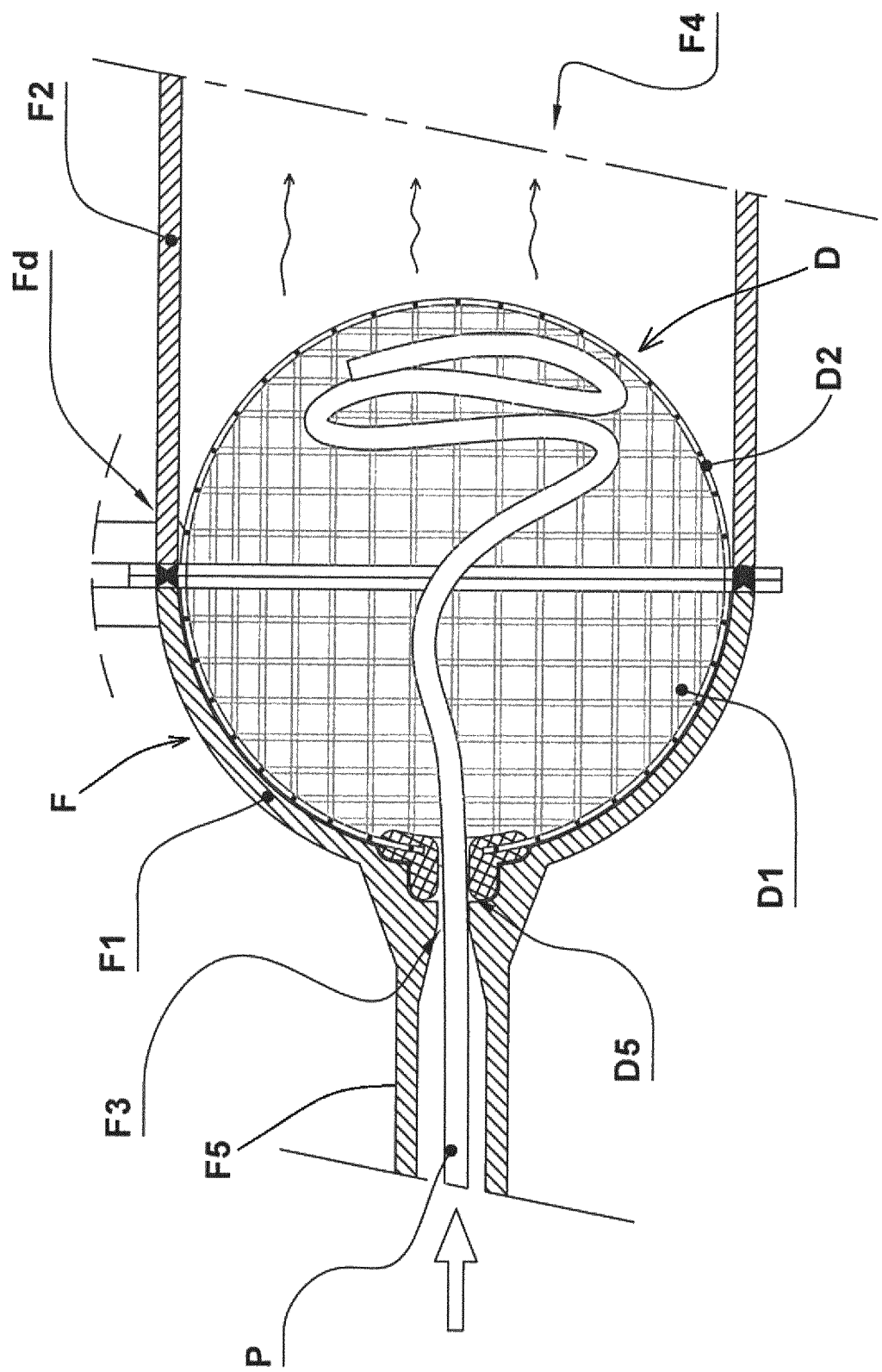
FIG. 3 is a detailed sectional view of the external enclosure in closed position that contains the mold during the extraction of a food product thread.

With reference to FIGS. 1-3, the device according to the invention is disclosed, which is generally indicated with reference numeral 1.

The device (1) comprises a mold (D), an external enclosure (F), a pneumatic system (A), a mechanism for moving the mold (D), mechanisms and levers for moving the external enclosure (F).

The following description generically refers to a thread (P) of a food product, meaning any food product configured as a continuous thread, which is given a three-dimensional shape with a random arrangement, and then is cooked or frozen.

Figure 4:
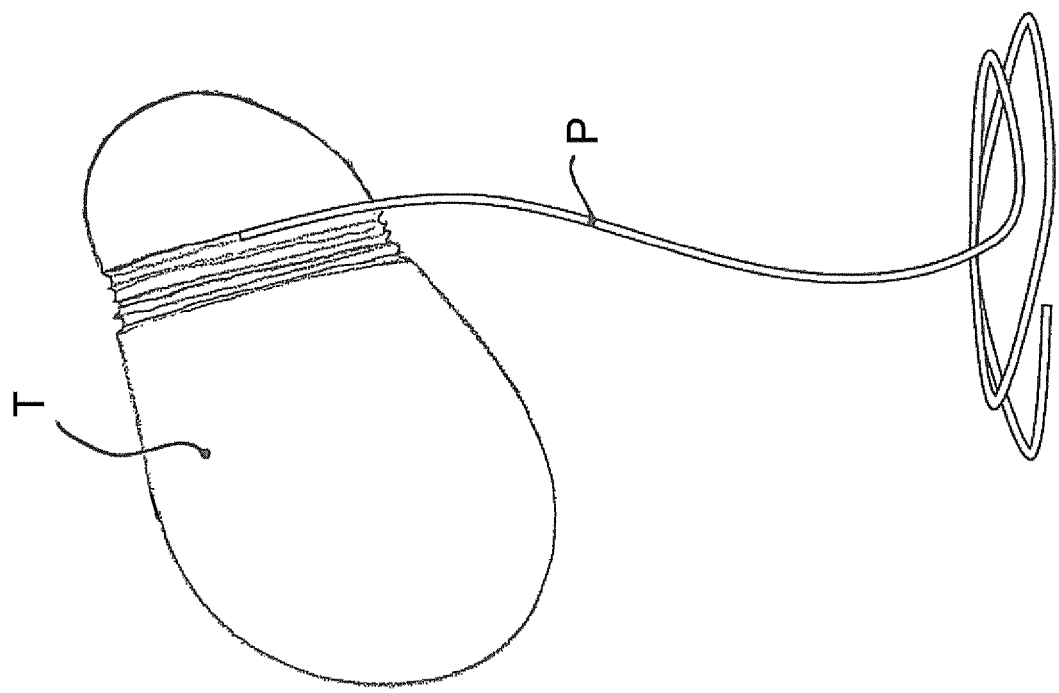
FIG. 4 is a diagrammatic view of the thread obtained from a tuber.

With reference to FIG. 4, the device (1) is especially useful in case of a continuous thread (P) of tuber (T), preferably a potato, which is obtained from peeling the raw product, and not converted into drawn paste. The thread (P) has a square or circular section with a constant diameter comprised between 2 and 4 mm.

The mold (D) comprises two half-shells (D1, D2) that can be closed. Each half-shell (D1, D2) is provided with openings that are smaller than the section of the food product thread (P). Advantageously, the thread (P) has a diameter that is slightly higher than 2 mm (for example 2.1-3 mm) and the openings of the half-shells have a diameter that is slightly lower than 2 mm (for example 1.7-1.9 mm). The two half-shells (D1, D2) of the mold are preferably made of a metal mesh or perforated sheet metal and are closed, either directly or indirectly. By opening the half-shells of the mold, the contents can be taken out from the mold.

When they are closed or joined, the two half-shells (D1, D2) of the mold define a volume that is substantially equal to the volume of the three-dimensional shape with a random arrangement of the food product thread (P). Preferably, the half-shells have a hemispherical shape and, when they are joined, the mold (D) has a spherical shape with diameter of approximately 2-4 CM.

The mold (D) has an inlet (D5) that is larger than the section of the food product thread (P). Preferably, the inlet (D5) is provided on one of two half-shells. Alternatively, the inlet can be formed when the two half-shells (D1, D2) are closed or joined and can be obtained by means of a different configuration of the joining edges of the two half-shells.

The mold (D) is provided with transportation means (B) that are suitable for connecting and transporting the mold along a conveyor (not shown in the figures), such as for example a conveyor belt or chain.

Advantageously, the transportation means (B) comprise a transportation appendage (D3, D4) connected to each half-shell (D1, D2).

Each transportation appendage (D3, D4) has a first portion (D3.1, D4.1) connected to the corresponding half-shell (D1, D2) and a second portion (D3.2, D4.2) connected to the first portion and suitable for being connected with the conveyor. The two first portions (D3.1, D4.1) of the transportation appendages are hinged in clamp-like mode in order to open and close the two half-shells (D1, D2). The two second portions (D3.2, D4.2) of the transportation appendage are joined in such a way to form a ring (D6) suitable for being fastened to a hook of the conveyor.

The external enclosure (F) is composed of a first part (F1) and a second part (F2) that can be closed. Each part (F1, F2) of the external enclosure is provided with an opening.

The external enclosure (F) is suitable for containing and housing the mold (D). In particular, the mold (D) is housed and contained in the external enclosure (F), in such a way that the mold cannot move or rotate inside the external enclosure.

The two parts (F1, F2) of the external enclosure can be opened and moved away, in such a way to insert and extract the mold in and from said external enclosure.

Closing seals (Fg) are provided on the edges of the parts (F1, F2) of the external closure (F).

In particular, the external enclosure (F) comprises:
a first opening (F3) disposed in the first part (F1) of the external enclosure and aligned with the inlet (D5) of the mold that is housed in said external enclosure,
a second opening (F4) disposed in the second part of the external enclosure, in a diametrally opposite position to the first opening (F3) and connected to the pneumatic system (A), and
a third opening (Fd) suitable for passing the conveyor means (B) of the mold that is housed in said external enclosure.

The first opening (F3) of the external enclosure substantially has the same dimensions as the inlet (D5) of the mold. The first opening (F3) of the external enclosure is suitable for passing the food product thread (P) from the exterior of the external enclosure to the interior of the mold.

The second opening (F4) of the external enclosure is suitable for being connected to the pneumatic system (A), which is an extraction fan (A1) suitable for extracting the air, according to this embodiment of the invention.

The actuation mechanisms and levers are suitable for opening and closing the parts (F1, F2) of the external enclosure, for housing and moving the mold (D) in the external enclosure (F) and for opening and closing the half-shells (D1, D2) that form the mold.

The second part (F2) of the external enclosure has a tubular or cylindrical shape with internal dimension equal to the external dimension of the mold (D). In view of the above, the extraction fan (A1) extracts the air on the entire surface of the mold in opposite position to its inlet (D5).

The food product thread (P), which comes out of a machine (M) used to configure the food product as a continuous thread, is moved, passing through the first opening (F3) of the external enclosure in order to pass through the inlet (D5) of the mold, being deposited in the internal volume of the mold.

Simultaneously, the extraction fan (A1), which is connected to the second opening (F4) of the external enclosure, attracts and aggregates the food product thread (P) in the space defined by the mold (D). In view of the above, the thread (P) is wound and twisted, forming a spherical ball (11) (FIG. 5) inside the mold (D).

In the example, the first part (F1) of the external enclosure, through which the food product thread (P) is passed, is firmly connected with the machine (M) used to configure the food product as a continuous thread, whereas the second part (F2) of the external enclosure is moved farther or closer and joined to the first part (F1) of the external enclosure. The first part (F1) of the external enclosure is shaped as a segment of a sphere, with a guide conduit (F5) connected to the machine (M) that produces the thread (P). The mold (D) to be filled is translated in alignment with said two parts (F1, F2) of the external enclosure, i.e. is pushed by the second part (F2) of the external enclosure (F) onto said first part (F1) of the external enclosure until the external enclosure (F) is closed.

When the mold (D) is filled with the food product thread (P) in a three-dimensional shape as a spherical ball with a random arrangement, the external enclosure (F) is opened and the mold, which is closed and filled with the food product thread (P), is extracted. The mold (D), which is filled with the food product thread, is then cooked or frozen. Before cooking, the mold is immersed in water in order to eliminate the starch from the thread disposed in the mold. During the cooking or freezing process, the thread (P) remains in the mold (D) in such a way to form a food product (100) (FIG. 5) with a substantially spherical three-dimensional shape that maintains its shape.

At the end of the cooking or freezing process, the mold (D) is opened and the food product (100) in three-dimensional shape with a random arrangement is extracted, either in cooked or frozen state.

The mold (D), which is empty and closed, is housed in the external enclosure (F) that is closed in order to receive the food product thread (P).

Advantageously, the device of the invention comprises at least one external enclosure (F) with extraction device (A) and multiple molds (D) connected to a conveyor. Said molds (D) are inserted in a sequence in said external enclosure (F) in order to receive the food product thread (P) and proceed with the cooking or freezing process.

Figure 6:
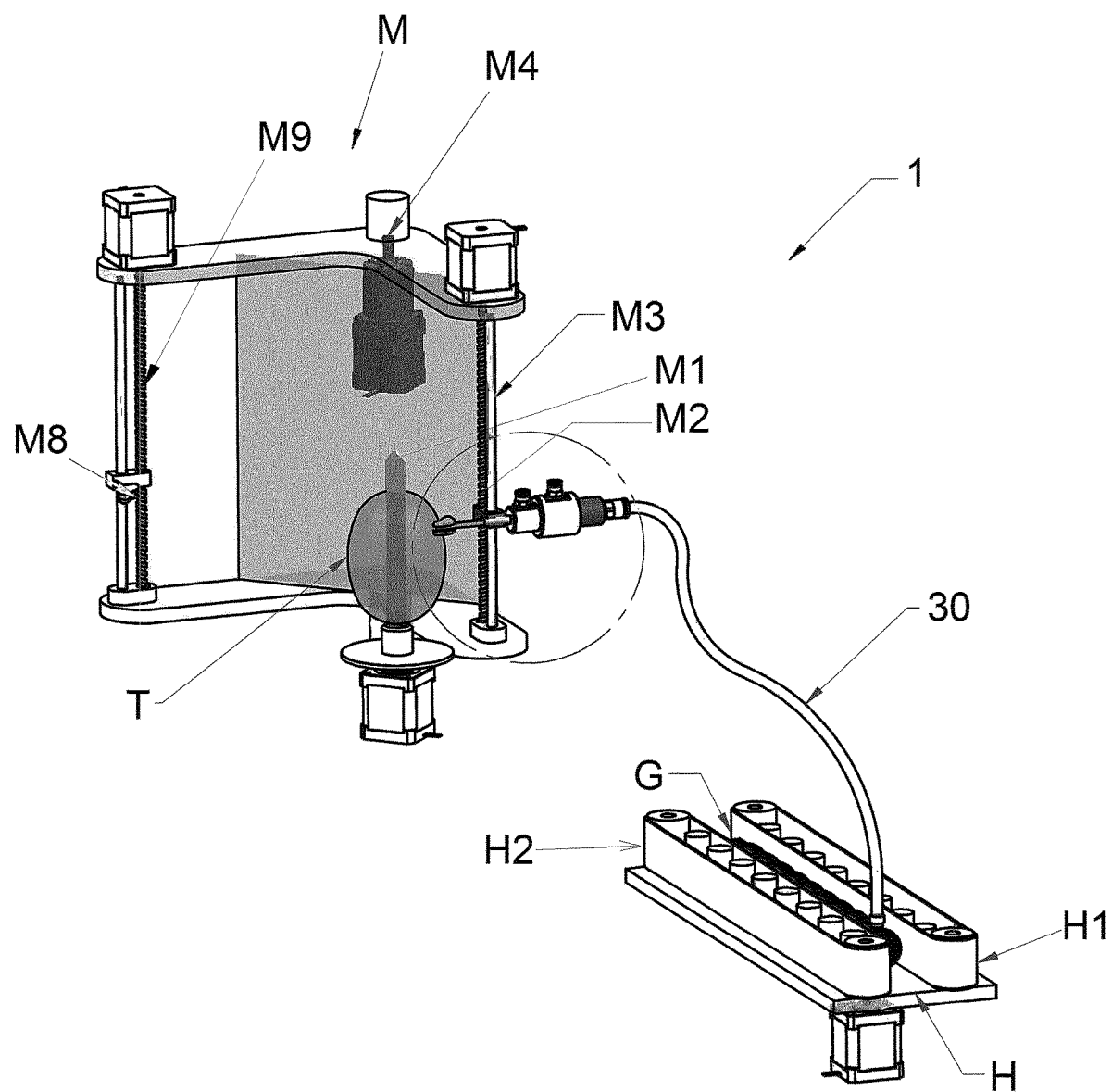
FIG. 6 is a perspective view of a second embodiment of the device according to the invention.
Figure 6A:
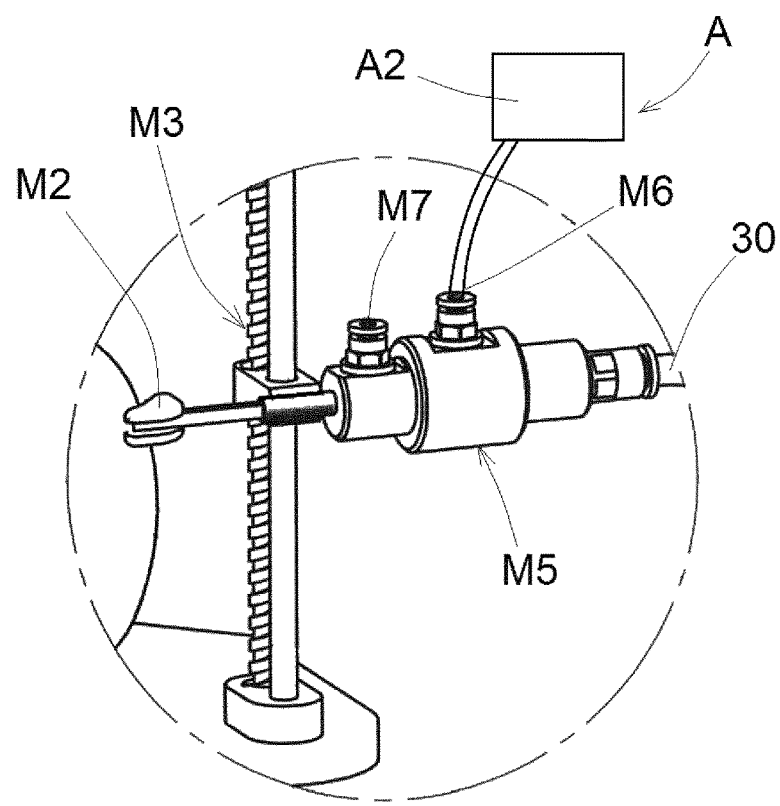
FIG. 6A is an enlarged view of a detail of FIG. 6.
Figure 7:
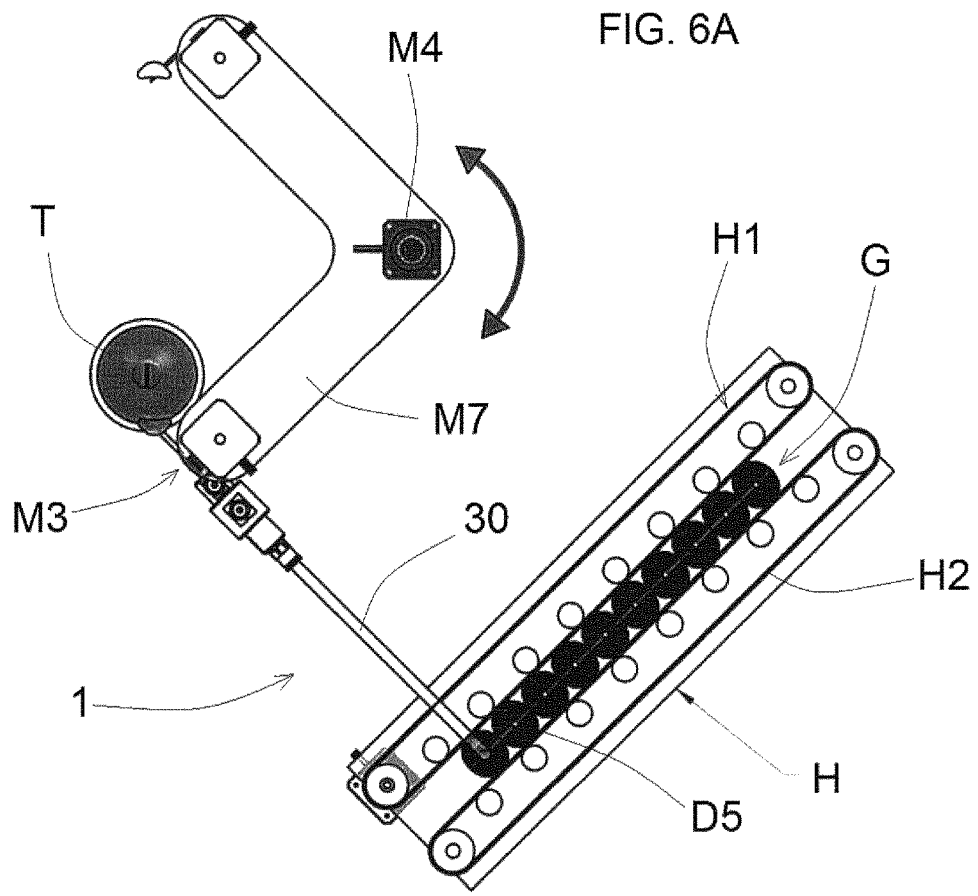
FIG. 7 is a top view of the device of FIG. 6.
Figure 8:
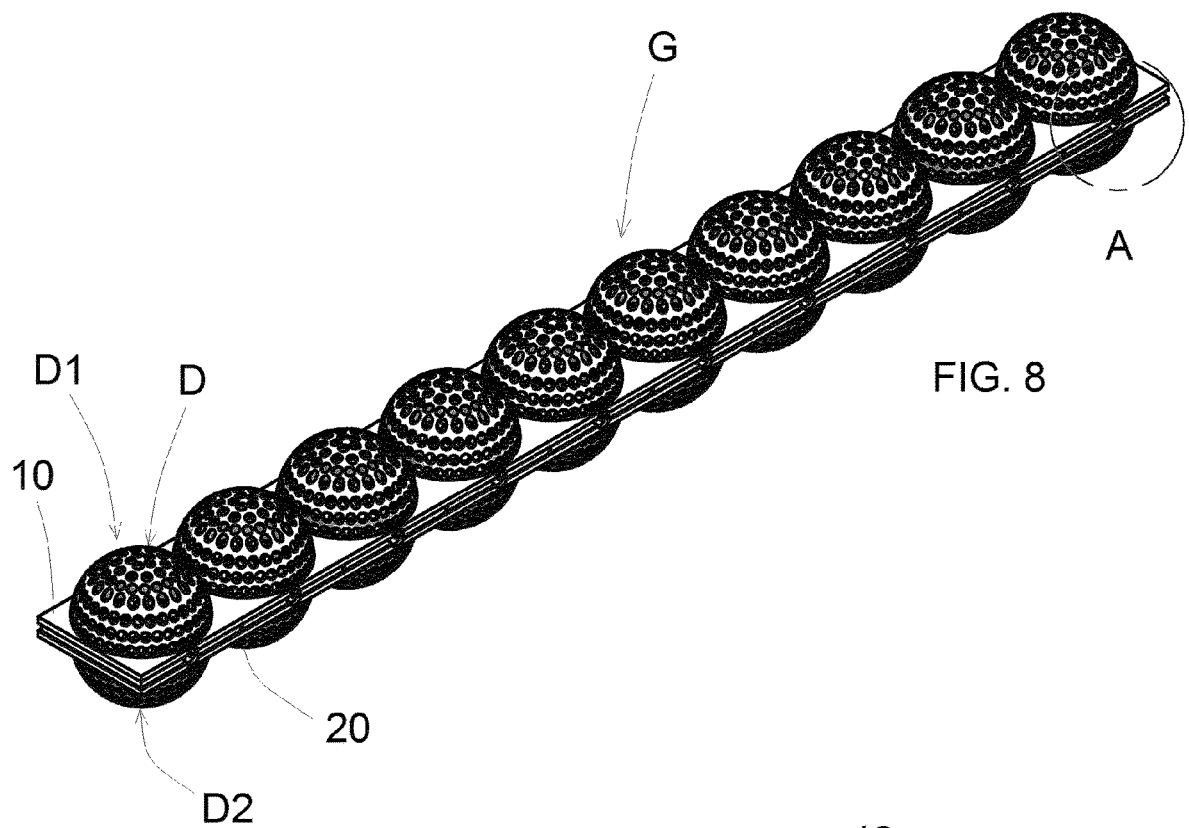
FIG. 8 is a perspective view of a mold die used in the device of FIG. 6.
Figure 8A:
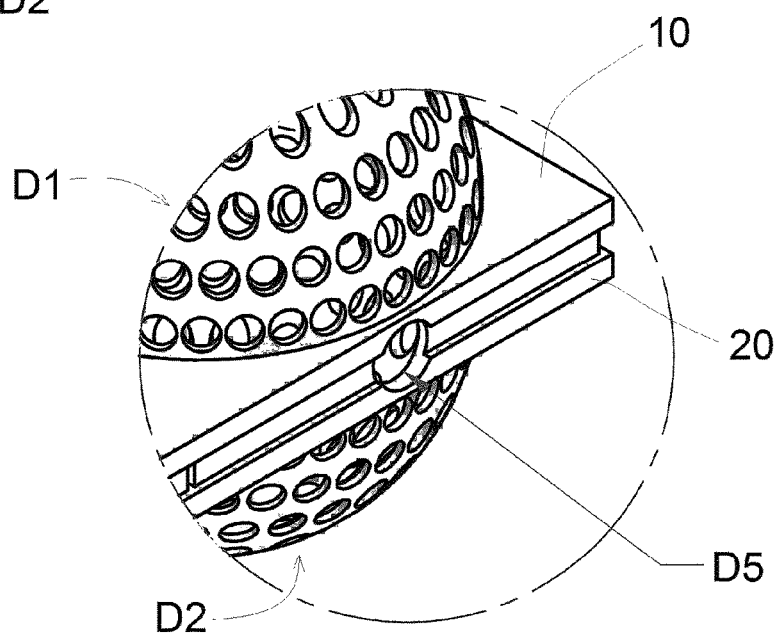
FIG. 8A is an enlarged view of a detail of FIG. 8.

With reference to FIGS. 6, 6A and 7, a second embodiment of the device according to the invention is disclosed.

The machine (M) for the production of the thread (P) comprises a rotary spindle (M1) on which a potato (T) is inserted, and a cutting tool (M2) that comes in contact with the potato that rotates in the spindle in such a way to obtain the thread (P) by turning the potato. The spindle (M1) is driven in rotation by an electrical engine.

Detection means detect the length of the thread (P). When the thread has reached a predefined length of approximately 70-100 cm, the turning of the thread is interrupted, the thread is detached from the potato and extracted into a conveyor pipe (30).

While the potato is turned, the cutting tool (M2) performs a work cycle, covering the shape of the potato from one side to the other side. The cutting tool (M2) is moved by an actuator (M3), such as for example a screw-female screw system. The cutting tool (M2) is held at a correct depth by a guide wheel that reads the potato profile. An electrical motor (M4) moves an arm (M7) that supports the cutting tool (M2) in order to adjust the cutting depth of the cutting tool. The movement of the cutting tool from one side to the other side of the potato is synchronized with the rotation of the spindle (M1) and with the pitch of the cutting tool when it gets closer to the spindle, in order to obtain a thread with uniform constant dimensions.

The configuration of the cutting tool (M2) is such to permit the automatic insertion of the thread (P) in the conveyor pipe (30). Such an operation is made easier by a pneumatic system with Venturi conduit (M5) used to suck the thread (P) cut by the cutting tool (M2) and to push it inside the conveyor pipe (30). The Venturi conduit (M5) is connected by means of a connection pipe (M6) to a pneumatic system (A2) used to introduce compressed air that creates the Venturi effect in order to suck the thread (P) in the conveyor pipe (30). Moreover, the Venturi conduit (M5) is provided with an inlet orifice (M7) for the introduction of washing water.

While the potato (T) is turned, the detection means, which consist in an electronic system that measures the movement of the spindle (M1) and of the cutting tool (M2), calculate the length of the thread and every time the target length is reached, the turning operation is stopped for a short period of time. In this way the thread can be interrupted and, when the thread (P) has entered the mold (D), a new empty mold is positioned in order to start a new cycle.

The conveyor pipe (30) is provided with sensors to control the correct movement of the thread and inform if the thread is jammed.

When the turning of the potato has almost reached a dimensional limit, the machine (M) finishes the potato that is currently being processed, stops the rotation of the spindle, places the cutting tool in idle position and loads a new potato (T) on the spindle.

During the turning steps of the potato, a water flow can be activated in the Venturi conduit (M5) in order to clean the processing area. Therefore the machine (M) is provided with a tank to collect and separate the water from the processing waste.

Optionally, the machine (M) can be provided with a roughing tool (M8) that is moved by means of an actuator (M9) of screw-female screw type.

The machine (M) can be applied to the device of FIGS. 1 and 3 by connecting the conveyor pipe (30) to the guide conduit (F5) of the external enclosure. In such a case, the pneumatic system (A) may comprise only the Venturi conduit (M5) that is connected to the pneumatic air compressed system (A2). Furthermore, the external enclosure (F) can be omitted and the conveyor pipe (30) can be directly connected to the inlet (D5) of the mold.

FIGS. 6, 7, 8 and 8A show a die (G) comprising a plurality of molds (D) that are aligned in a row. The die (G) comprises a first plate (10) wherein first half-shells (D1) are disposed and a second plate (20) whereon second half-shells (D2). The inlets (D5) are obtained between the first plate (10) and the second plate (20) in correspondence of each mold (D).

The die (G) is transported by a conveyor (H) that comprises two chains (H1, H2). The die (G) is disposed on the conveyor (H) with the inlets (D5) facing upwards, in such a way that they can be disposed sequentially at the outlet of the conveyor pipe (30) to receive the thread (P).

The conveyor (H) is provided with sensors suitable for informing the operator when another die (G) with empty molds (D) is to be disposed on the conveyor (H) and when the die (G) with full molds is to be taken in order to remove the product.

Figure 5:
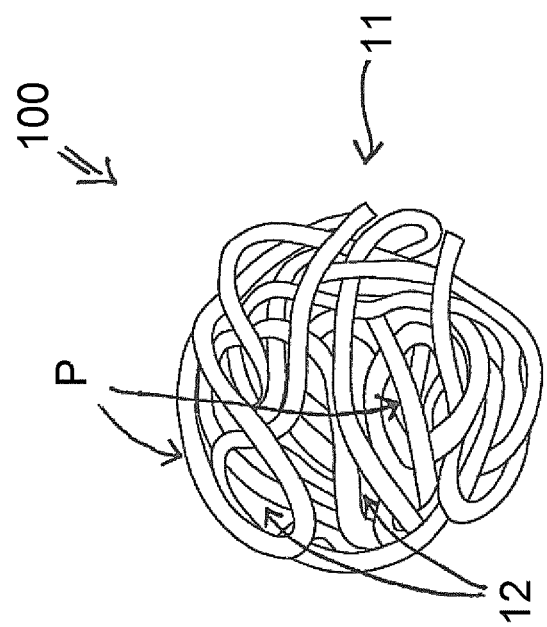
FIG. 5 is a diagrammatic view of the food product according to the invention.

With reference to FIG. 5, the food product (100) of the invention comprises a thread (P) with square or circular section and constant diameter, which is lower than 5 mm, preferably 2-3 mm.

Said thread (P) is obtained by continuously cutting a tuber (T), preferably a potato, preferably a raw potato. The thread has a length of approximately 70-100 cm.

The thread (P) is wound and twisted by means of the device (1), in such way to form a ball (11) inside the mold, said ball (11) having a spherical shape with interstitial spaces (12) between the spirals of the thread (P) having a width of approximately 2-10 mm.

Such a thread ball (P) inside the mold is cooked, for example fried in oil, at a given temperature and for a given period of time, or is cooked according to substantially equivalent modes. The food product (100) has a suitable consistency and is shaped as a spherical ball with interstitial spaces between the spirals of the thread (P) that is wound and twisted.

Because of the low, substantially constant section of the thread (P) and of the spherical ball shape with interstitial spaces between the spirals, the exposed surface is maximized and the cooking time is consequently reduced, with the same quantity of material, compared to a body with a different shape. Moreover, because of the special shape and arrangement of the thread (P), the entire thread (P) is uniformly cooked.

Conveniently, when measured in its largest point, the food product (100) has a diameter lower than 5 cm, preferably comprised between 2 and 4 cm. In this way, the size of the food product corresponds to one bite, being it easier for the user to eat and chew it.

The invention claimed is:

1. A device for molding a thread shaped food product, the device comprising:
   a perforated spherical mold openable into a pair of half-shells, said pair of half-shells of said perforated spherical mold being formed of a metal mesh, said perforated spherical mold having an inlet adapted to pass a food product thread into an interior of said perforated spherical mold such that the food product thread is aggregated in a three-dimensional shape with a wound and twisted arrangement forming a substantially spherical ball shape; and
   a pneumatic system coupled to said perforated spherical mold so as to extract air from the interior of said perforated spherical mold and aggregate the food product thread in the interior of said perforated spherical mold, said pneumatic system adapted to urge the food product thread to pass through the inlet of said perforated spherical mold so as to be deposited in the interior of said perforated spherical mold.

2. The device of claim 1, further comprising:
   an external enclosure containing said perforated spherical mold, said external enclosure comprising:
      a first part having a first opening aligned with the inlet of said perforated spherical mold; and
      a second part coupled to said first part.

3. The device of claim 2, wherein said first part of said external enclosure is connected to a machine, the machine being adapted to configure a food product into a continuous thread, said second part of said external enclosure being translatable from a first position permitting an insertion and extraction of said perforated spherical mold into or from said external enclosure to a second position wherein said first part and said second part are completely closed so as to allow said pneumatic system to extract air from the interior of the perforated spherical mold and aggregate the food product thread in the interior of the perforated spherical mold.

4. The device of claim 3, wherein said pneumatic system is a fan connected to an opening in said second part of said external enclosure.

5. The device of claim 1, wherein said pneumatic system comprises a Venturi conduit connected to a pneumatic compressed air system and to a conveyor pipe connected to the inlet of said perforated spherical mold.

6. The device of claim 1, wherein said perforated spherical mold has a transporter adapted to be connected to a conveyor.

7. The device of claim 6, wherein the transporter comprises a pair of transportation appendages respectively connected to the pair of half-shells.

8. The device of claim 7, wherein each of the pair of transportation appendages has a first portion connected to a corresponding half-shell of the pair of half-shells and a second portion connected to the first portion and adapted to be connected to the conveyor, wherein the first portions of the pair of transportation appendages are hinged in order to open and close the pair of half-shells, the second portions of the pair of transportation appendages being joined so as to form a ring adapted to be fastened to a hook of the conveyor.

* * * * *